(No Model.)
G. W. SMITH.
VEHICLE POLE.
No. 505,964. Patented Oct. 3, 1893.
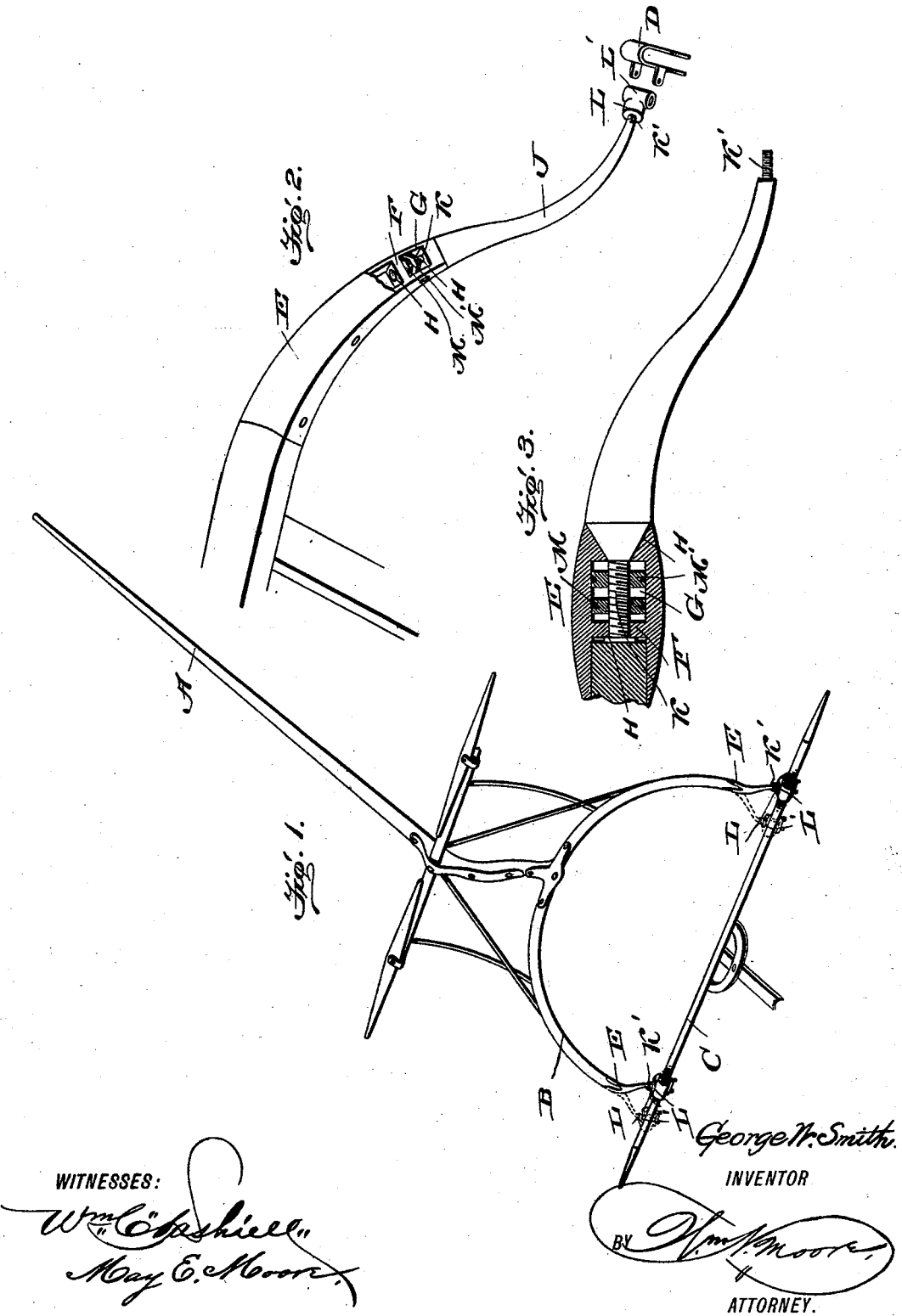
WITNESSES:
Wm E Dashiell
May E. Moore
INVENTOR
George W. Smith
BY Wm N Moore
ATTORNEY.

UNITED STATES PATENT OFFICE.

GEORGE WELLS SMITH, OF UNION CITY, INDIANA.

VEHICLE-POLE.

SPECIFICATION forming part of Letters Patent No. 505,964, dated October 3, 1893.

Application filed January 9, 1893. Serial No. 457,828. (No model.)

*To all whom it may concern:*

Be it known that I, GEORGE WELLS SMITH, a citizen of the United States, residing at Union City, in the county of Randolph and State of Indiana, have invented certain new and useful Improvements in Pole or Shaft Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in vehicle poles and shafts, and the object of my invention is the provision of simple, inexpensive and durable means carried by the pole or shafts and adapted to be adjusted in order that the thill irons of the pole or shafts can be used in connection with vehicles having the shackles or draw-irons different distances apart, or to enable the pole or shafts to be used with any vehicle.

To attain the desired objects the invention consists in an adjusting device for poles and shafts embodying novel features of construction and combination of parts substantially as herein disclosed.

Figure 1 represents a perspective view of a pole provided with my adjusting devices. Fig. 2 represents an elevation of the adjusting device, and Fig. 3 represents a sectional view thereof.

Referring by letter to the drawings, A designates a carriage pole; B the circle bar; C the axle and D the clips or draw irons all of which are of well known construction.

To the ends of the circle bar are secured the metal socket pieces or shells E, having the partition wall F providing a chamber G, and through the said wall and the inner ends of the socket pieces or shells is made an opening or passage H.

The thill irons J are provided with the screw threaded inner ends K which fit in the openings H, and with the screw threaded outer ends K' which engage the threaded sleeves or ferrules L having the eye L' which receives the bolt for connecting the same with the draw-irons. The inner ends of the draw irons are enlarged or rimmed to prevent the same from detachment with the shells and on the threaded portions K are fitted the nuts M and M' which serve to permit the adjustment of the thill irons and retain the same in place.

The operation of my device will be readily understood and I will simply say that the thill iron is turned by the hand after the manner of a wrench and when turning one of the nuts is held from movement and the other turns with the iron and the nuts act to jam or hold the thill iron at any adjustment, as shown in dotted lines in Fig. 1.

I claim as my invention—

1. In combination with a shaft or pole, the socket pieces or shells having the opening therein, the thill irons having the threaded end arranged in said opening, the nuts engaging said threaded end, and the eye at the other ends of the thill irons for connection with the clips, in the manner described.

2. In combination with the clips and the shafts or pole, the shells or socket pieces, the thill irons rotatable in said shells or socket pieces, and means for securing the thill irons at the proper adjustment, in the manner described.

3. In combination with the clips and the shafts or pole, the socket pieces or shells having the compartment, the opening in the walls of said compartment, the thill irons having the threaded end for engagement with the opening, the nuts on said threaded ends, and the eyes at the other ends of the thill irons for connection with the clips, in the manner described.

4. In combination with the clips and the shafts or pole, the socket pieces or shells having the compartment provided with an opening in the walls thereof, the thill irons having the inner end threaded and swiveled in said opening, the nuts engaging said threaded end, the thimble or ferrule secured to the other ends of the thill irons and having the eye to be connected to the clip, in the manner described.

In testimony whereof I affix my signature in presence of two witnesses.

GEORGE WELLS SMITH.

Witnesses:
CRATE D. BOWEN,
JNO. A. SHOCKNEY.